(12) United States Patent
Knoener et al.

(10) Patent No.: US 12,157,190 B2
(45) Date of Patent: Dec. 3, 2024

(54) INPUT POWER USER INTERFACES FOR WELDING POWER SUPPLIES

(71) Applicant: Illinois Tool Works Inc., Glenview, IL (US)

(72) Inventors: Craig Knoener, Appleton, WI (US); Joseph C. Schneider, Greenville, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 18/203,443

(22) Filed: May 30, 2023

(65) Prior Publication Data

US 2023/0294194 A1     Sep. 21, 2023

Related U.S. Application Data

(63) Continuation of application No. 16/883,642, filed on May 26, 2020, now Pat. No. 11,660,698.

(51) Int. Cl.
| | | |
|---|---|---|
| G06F 3/048 | (2013.01) | |
| B23K 9/095 | (2006.01) | |
| B23K 9/10 | (2006.01) | |

(52) U.S. Cl.
CPC .......... *B23K 9/1062* (2013.01); *B23K 9/0953* (2013.01)

(58) Field of Classification Search
CPC ............................ B23K 9/1062; B23K 9/0953
See application file for complete search history.

(56) References Cited

U.S. PATENT DOCUMENTS

| | | | |
|---|---|---|---|
| 4,721,947 A | 1/1988 | Brown | |
| 10,216,396 B2 | 2/2019 | Evans | |
| 10,807,180 B2 * | 10/2020 | Kawamoto | B23K 9/09 |
| 10,994,357 B2 * | 5/2021 | Daniel | B23K 9/0953 |
| 11,209,813 B2 | 12/2021 | Cella | |

(Continued)

FOREIGN PATENT DOCUMENTS

| | | |
|---|---|---|
| DE | 2813339 | 10/1979 |
| EP | 3888834 | 10/2021 |
| WO | 2014203022 | 12/2014 |

OTHER PUBLICATIONS

European Office Communication with extended Search Report Appln No. 21173873.7 dated Oct. 28, 2021.

*Primary Examiner* — David Phantana-angkool
(74) *Attorney, Agent, or Firm* — McAndrews, Held & Malloy, Ltd.

(57) ABSTRACT

Disclosed example power supplies, user interfaces, and methods provide for monitoring, analysis and/or presentation of input power characteristics for a welding-type power supply and/or wire feeder. A welding system includes a power supply to deliver power to a welding torch based on one or more input power characteristics. The input power characteristics may correspond to received input power characteristics values during a welding procedure. The input power characteristics are responsive to the power demanded during the welding operation and may change accordingly. To maintain an accounting of the input power characteristics and their values as they change during the welding operation, control circuitry may receive information regarding the input characteristics, analyze the information, and/or generate presentable indicators for display on one or more graphical interfaces.

20 Claims, 7 Drawing Sheets

(56) References Cited

U.S. PATENT DOCUMENTS

| | | | |
|---|---|---|---|
| 11,278,980 B2 | 3/2022 | Mehn | |
| 11,407,110 B2* | 8/2022 | Lonsberry | B23K 9/0956 |
| 2004/0232128 A1 | 11/2004 | Niedereder et al. | |
| 2017/0165775 A1 | 6/2017 | Knoener | |
| 2017/0225253 A1* | 8/2017 | Matsuoka | B23K 9/095 |
| 2018/0036824 A1* | 2/2018 | Peters | B23K 9/1062 |
| 2018/0178305 A1 | 6/2018 | Cole | |
| 2019/0146665 A1 | 5/2019 | Evans | |
| 2020/0101550 A1* | 4/2020 | Murakami | B23K 9/173 |
| 2020/0326838 A1 | 10/2020 | Evans | |
| 2021/0299777 A1* | 9/2021 | Dunahoo | B23K 9/0953 |
| 2022/0055140 A1* | 2/2022 | Bowman | B23K 9/1062 |
| 2022/0143731 A1* | 5/2022 | Bowman | B23K 9/0953 |
| 2022/0187822 A1 | 6/2022 | Cella | |
| 2022/0226922 A1* | 7/2022 | Albrecht | B23K 9/0953 |
| 2023/0047632 A1* | 2/2023 | Lonsberry | B25J 9/1664 |
| 2024/0033935 A1* | 2/2024 | Lonsberry | B23K 37/04 |
| 2024/0075629 A1* | 3/2024 | Lonsberry | G06V 10/82 |

* cited by examiner

INPUT POWER USER INTERFACES FOR WELDING POWER SUPPLIES

BACKGROUND

A common metal welding technique employs the heat generated by electrical arcing to transition a work piece to a molten state, to facilitate a welding process. One technique that employs this arcing principle is wire feed welding. If the welding device is properly adjusted, the wire feed advancement and arcing cycle progresses smoothly, providing a good weld.

Traditionally, during a welding operation, an operator selects the level and types of resources provided to the weld location, depending, of course, on the particulars of the weld and the materials being welded. Different kinds of wire electrode, however, perform well at different operational settings of the welding device.

Conventionally, welding devices rely on the knowledge and acumen of the operator to select the most appropriate voltage and wire feed settings for the wire electrode being used and the particular weld conditions. Unfortunately, in many cases, the weld operator is a novice to the field, especially in the case of entry level welding devices. If the input power does not have the capacity to fully and consistently provide power demanded for a welding operation, the operator may not have information to adjust settings and/or processes, which may result in insufficient outputs to produce a good weld, or any weld at all, and may also cause issues with the welding power supply itself.

SUMMARY

Welding power supplies and user interfaces for an input power characteristics monitoring, analysis and/or presentation process for welding power supplies are disclosed, substantially as illustrated by and described in connection with at least one of the figures, as set forth more completely in the claims.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

The figures are not necessarily to scale. Where appropriate, similar or identical reference numbers are used to refer to similar or identical components.

DETAILED DESCRIPTION

Disclosed example power supplies, user interfaces, and methods provide for monitoring, analysis and/or presentation of input power characteristics for a welding-type power supply and/or wire feeder.

In some examples, a welding system includes a power supply to deliver power to a welding torch based on one or more input power characteristics (e.g., voltage, current, power, wire feed speed, gas flow rate, pulse rate, workpiece thickness, workpiece material type, electrode type, welding process, travel speed, arc length, or joint type, etc.).

As disclosed herein, the input power characteristics may correspond to received input power characteristics values during a welding procedure (e.g., based on material type, electrode diameter, welding process and/or tool, etc.). The input power characteristics are responsive to the power demanded during the welding operation and may change accordingly. To maintain an accounting of the input power characteristics and their values as they change during the welding operation, control circuitry may receive information regarding the input characteristics (from one or more sensors), analyze the information, and/or generate presentable indicators for display on one or more graphical interfaces (such as a meter, gauge, graphical band, value presentation, etc.).

Some welding power supplies can connect to and draw primary power from a variety of power sources (e.g., engine driven generators, energy storage systems, mains power, etc.). However, when a welding power supply is connected to a 120V source, the power supply may experience issues associated with the 120V service. For example, there are any number of service requirements (e.g., from the National Electric Code (NEC)) in order for a welding power supply to provide the full range of outputs. Requirements may include one or more input power characteristics, such as input voltage, input current at rated output, recommended fusing, input conductor sizing, maximum input conductor length, etc. If an extension cord is to be employed, consideration should be given to conductor size, extension cord length, etc., in order to mitigate voltage drop (which can be calculated based on a rated primary current). However, an operator may not have information of the input power characteristics and/or the power demands of the welding operation needed to make an informed decision.

In some examples, the welding power supply may be connected to a generator. During a welding operation, the welding power supply experiences dynamic power output requirements and the generator may not be able to meet those requirements. However, often these issues are not understood by an operator. Further, the welding conditions may change (such as during a large welding project). If the welding power supply is operated without consideration to input requirements, a number of issues may result, such as degraded weld quality, interruption of a weld, damage to the welding power supply, and/or damage to the power source.

For example, if the service to the welding power supply is insufficient, welding issues often occur. A common problem is that a circuit breaker in the service panel trips (disconnecting the power at the outlet). A tripped circuit breaker would provide no feedback to the user, either to the conditions that existed as the circuit breaker tripped, and/or that the circuit breaker is going to trip. Once the circuit breaker does trip, the welding power supply is no longer able to provide any information regarding the operating conditions that led to the tripped circuit breaker.

Yet another issue is associated with the voltage drop from conductors within an undersized service (e.g., conductors from a service panel to an outlet, conductors from an outlet to a welding power supply, etc.). Depending on the power conversion circuitry and/or type of control circuitry of the welding power supply, a number of different issues may arise. One issue is that the secondary welding voltage may sag; again, with no indication provided to the operator. Another issue is that the primary voltage may elevate, again with no indication provided to the operator. Yet another issue is that the welding transfer may change, and may change significantly enough to cause an unacceptable welding transfer, again with no indication provided to the operator. And yet another issue is that during a welding operation the welding power supply may terminate the weld altogether when the input or primary voltage is too low to continue welding.

The disclosed systems and methods provide advantages over conventional systems, such that an operator is provided with immediate feedback regarding characteristics of the input power (e.g., mains or primary power) with easy-to-understand graphical interfaces (e.g., meters, graphics, text, patterns, etc.). For example, the user can quickly determine if their input power levels have changed and check the power source. If an extension cord is undersized for the application the operator may either remove the extension cord or use a lower power setting on the welding power source. The user also knows how much margin they have before a circuit breaker might trip.

The provided graphical interface provides value ranges calculated to allow an operator to readily understand how input power variations can impact welding power supply performance and weld quality in a visual fashion. Furthermore, data corresponding to the input power variations may be stored, analyzed, and/or accessed to diagnose welding power supply issues at the job site or for later maintenance.

In some disclosed examples, a welding power supply includes an input circuit to receive input power from a power source, one or more graphical interfaces representing one or more input power characteristics of the input power, and a control circuitry. The control circuitry is configured to generate a graphical band representing a range of operational values including an upper limit value or a lower limit value for one or more input power characteristics based on the one or more thresholds, display the graphical band on the one or more graphical interfaces relative to a rated input value, calculate an average value of the one or more input power characteristics at the input circuit, generate a marker representing the average value of the one or more input power characteristics, and display the marker on the one or more graphical interfaces such that the position of the marker is arranged based on the average value relative to the upper limit value or the lower limit value of the range of operational values.

In some examples, the graphical band is a first graphical band corresponding to a first range of operational values for the one or more power characteristics based on a first input power operational threshold of the one or more input power operational threshold, the control circuitry further configured to generate a second graphical band corresponding to a second range of operational values based on a second input power operational threshold of the one or more input power characteristics.

In some examples, the first input power operational threshold corresponds to a first variance from the rated input value, and the second input power operational threshold corresponds to a second variance from the rated input value. In examples, the control circuitry is further configured to generate a third graphical band corresponding to a third range of operational values based on a third input power operational threshold of the one or more input power characteristics.

In some examples, the control circuitry is further configured to receive data corresponding to one or more input power operational threshold corresponding to the one or more input power characteristics, the one or more input power operational threshold including one or more thresholds, and calculate the range of operational values including an upper limit value or a lower limit value for the one or more input power characteristics based on the one or more thresholds.

In some disclosed examples, a welding power supply includes an input circuit to receive input power from a power source, one or more graphical interfaces representing one or more input power characteristics of the input power, and a control circuitry. The control circuitry is configured to receive data corresponding to first and second input power operational threshold corresponding to the one or more input power characteristics, calculate a first range of operational values including a first upper limit value or a first lower limit value for the one or more input power characteristics based on the first input power operational threshold, generate a first graphical band representing the first range of operational values for the one or more input power characteristics, calculate a second range of operational values including a second upper limit value or a second lower limit value for the one or more input power characteristics based on the second input power operational threshold, generate a second graphical band representing the second range of operational values for the one or more input power characteristics, display the first graphical band and the second graphical band on the one or more graphical interfaces relative to a rated input value, calculate an average value of the one or more input power characteristics at the input circuit, generate a marker representing the average value of the one or more input power characteristics, and display the marker on the one or more graphical interfaces such that the position of the marker is arranged based on the average value relative to the first or second upper limit value or the first or second lower limit value.

In some examples, the control circuitry is further configured to measure values of the one or more input power characteristics over a predetermined period of time, and calculate the average input power value based on the measured value over the predetermined period of time. In examples, the upper limit or the lower limit corresponds to a predetermined value or a percentage of the rated input value. In examples, the upper limit or the lower limit is between 5 and 50 percent of the rated input value. In examples, the one or more input power characteristics includes one or more of voltage, current, power, frequency, power factor, harmonics, distortion, or line balance.

In some examples, data corresponding to the one or more input power operational threshold are stored in a list of input power operational threshold, the control circuitry further configured to receive the data from the list. In examples, the one or more input power operational threshold correspond to one or more welding process types.

In some examples, the control circuitry is further configured to receive an input relating to a first welding process type, access a list of input power operational threshold corresponding to welding process types, and calculate the range of operational values for the one or more input power characteristics based at least in part on the welding process type. In examples, the control circuitry is further configured to control the welding power supply to maintain an output value of one or more output power characteristics within the first range of operational values or the second range of operational values.

In some examples, the control circuitry is further configured to calculate an extension range for the one or more input power characteristics based on one or more of the rated value, the welding process type, or the range of operational values for the one or more input power characteristics, calculate a period of time the average value can operate in the extension range, and control a power output level in response to the average value operating in the extension range for a time greater than the calculated period of time. In examples, the control circuitry is further configured to generate an alert when the average value of the one or more input power characteristics is outside the range of operational values. In examples, each graphical interface further comprises a numerical indicator corresponding to one or more of the average value or the rated value.

In some examples, the control circuitry is further configured to compare the average input value with the rated input value, calculate a voltage drop between the power source and the input circuit based on the comparison, and generate an alert when the voltage drop is outside a predetermined threshold value. In examples, the control circuitry is further configured to display a first characteristic on the first graphical band and a second characteristic on the second graphical band, wherein the first or second characteristic comprises one of a color, an intensity, a shape, a size, or a pattern.

In some examples, the control circuitry is further configured to monitor the average value over a first period of time, determine a maximum average input value over the first period of time, generate an graphical indicator corresponding to the maximum average value, and display the graphical indicator on the one or more graphical interfaces such that the position of the graphical indicator is arranged relative to the first or second upper limit value or the first or second lower limit value for a second period of time.

As used herein, "power conversion circuitry" and/or "power conversion circuits" refer to circuitry and/or electrical components that convert electrical power from one or more first forms (e.g., power output by a generator) to one or more second forms having any combination of voltage, current, frequency, and/or response characteristics. The power conversion circuitry may include safety circuitry, output selection circuitry, measurement and/or control circuitry, and/or any other circuits to provide appropriate features.

As used herein, the terms "first" and "second" may be used to enumerate different components or elements of the same type, and do not necessarily imply any particular order.

The term "welding-type system," as used herein, includes any device capable of supplying power suitable for welding, plasma cutting, induction heating, CAC-A and/or hot wire welding/preheating (including laser welding and laser cladding), including inverters, converters, choppers, resonant power supplies, quasi-resonant power supplies, etc., as well as control circuitry and other ancillary circuitry associated therewith.

As used herein, the term "welding-type power" refers to power suitable for welding, plasma cutting, induction heating, CAC-A and/or hot wire welding/preheating (including laser welding and laser cladding). As used herein, the term "welding-type power supply" and/or "power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

As used herein, a "circuit," or "circuitry," includes any analog and/or digital components, power and/or control elements, such as a microprocessor, digital signal processor (DSP), software, and the like, discrete and/or integrated components, or portions and/or combinations thereof.

The terms "control circuit," "control circuitry," and/or "controller," as used herein, may include digital and/or analog circuitry, discrete and/or integrated circuitry, microprocessors, digital signal processors (DSPs), and/or other logic circuitry, and/or associated software, hardware, and/or firmware. Control circuits or control circuitry may be located on one or more circuit boards that form part or all of a controller, and are used to control a welding process, a device such as a power source or wire feeder, and/or any other type of welding-related system.

As used herein, the term "memory" includes volatile and non-volatile memory devices and/or other storage device.

As used herein, the term "torch," "welding torch," "welding tool" or "welding-type tool" refers to a device configured to be manipulated to perform a welding-related task, and can include a hand-held welding torch, robotic welding torch, gun, or other device used to create the welding arc.

As used herein, the term "welding mode," "welding process," "welding-type process" or "welding operation" refers to the type of process or output used, such as current-controlled (CC), voltage-controlled (CV), pulsed, gas metal arc welding (GMAW), flux-cored arc welding (FCAW), gas tungsten arc welding (GTAW), shielded metal arc welding (SMAW), spray, short circuit, and/or any other type of welding process.

As used herein, the term "welding program" includes at least a set of welding parameters for controlling a weld. A welding program may further include other software, algorithms, processes, or other logic to control one or more welding-type devices to perform a weld.

Figure 1A:
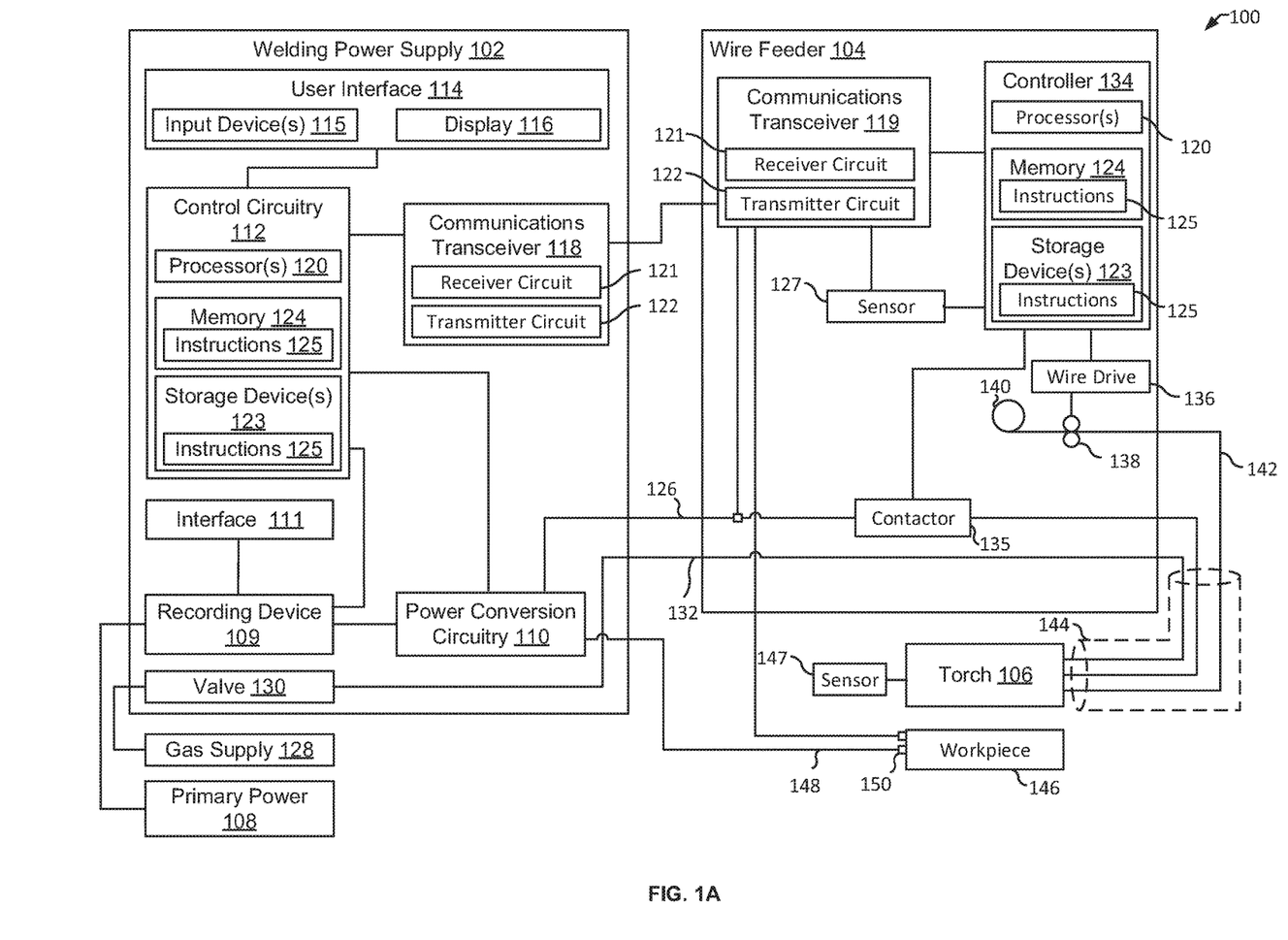
FIG. 1A is a schematic diagram of an example welding system to implement an input power characteristics monitoring, analysis and/or presentation process, in accordance with aspects of this disclosure.

Turning now to the drawings, FIG. 1A is a block diagram of an example welding system 100 having a welding-type power supply 102, a wire feeder 104, and a welding torch 106. The welding system 100 powers, controls, and supplies consumables to a welding application via the power supply 102 and/or wire feeder 104. In some examples, input power from a power source (e.g., mains power, etc.) is monitored and analyzed at the power supply 102. Input power characteristics are determined and/or calculated by control circuitry (e.g., control circuitry 112), and presented on a graphical interface to provide data, information, analysis, alerts, and/or guidance to an operator. The operator may respond to conditions (including changes in conditions) to delivery of input power, as to mitigate issues stemming from insufficient input (e.g., low power input, voltage drop, inconsistent supply of power, etc.). In some examples, the analyzed data is provided to the control circuitry to automatically implement one or more actions to mitigate issues stemming from changes to the input power characteristics.

In some examples, the power supply 102 directly supplies input power to the welding torch 106. The welding torch 106 may be a torch configured for shielded metal arc welding (SMAW, or stick welding), tungsten inert gas (TIG) welding, gas metal arc welding (GMAW), flux cored arc welding (FCAW), based on the desired welding application. In the illustrated example, the power supply 102 is configured to supply power to the wire feeder 104, and the wire feeder 104 may be configured to route the input power to the welding torch 106. In addition to supplying an input power, the wire feeder 104 may supply a filler metal to a welding torch 106 for various welding applications (e.g., GMAW welding, flux core arc welding (FCAW)). While the example system 100 of FIG. 1A includes a wire feeder 104 (e.g., for GMAW or FCAW welding), the wire feeder 104 may be replaced by any other type of remote accessory device, such as a stick welding and/or TIG welding remote control interface that provides stick and/or TIG welding The power supply 102 receives primary power 108 (e.g., from the AC power grid, an engine/generator set, a battery, or other energy generating or storage devices, or a combination thereof), conditions the primary power, and provides an output power to one or more welding devices in accordance with demands of the system 100. The primary power 108 may be supplied from an offsite location (e.g., the primary power may originate from the power grid). The power supply 102 includes power conversion circuitry 110, which may include transformers, rectifiers, switches, and so forth, capable of converting the AC input power to AC and/or DC output power as dictated by the demands of the system 100 (e.g., particular welding processes and regimes). The power conversion circuitry 110 converts input power (e.g., the primary power 108) to welding-type power based on a weld voltage setpoint and outputs the welding-type power via a weld circuit.

In some examples, the power conversion circuitry 110 is configured to convert the primary power 108 to both welding-type power and auxiliary power outputs. However, in other examples, the power conversion circuitry 110 is adapted to convert primary power only to a weld power output, and a separate auxiliary converter 111 is provided to convert primary power to auxiliary power. In some other examples, the power supply 102 receives a converted auxiliary power output directly from a wall outlet. Any suitable power conversion system or mechanism may be employed by the power supply 102 to generate and supply both weld and auxiliary power.

The power supply 102 includes a control circuitry 112 to control the operation of the power supply 102. The power supply 102 also includes a user interface 114. The control circuitry 112 receives input from the user interface 114, through which a user may choose a process and/or input desired parameters (e.g., voltages, currents, particular pulsed or non-pulsed welding regimes, and so forth). The user interface 114 may receive inputs using one or more input devices 115, such as via a keypad, keyboard, physical buttons, a touch screen (e.g., software buttons), a voice activation system, a wireless device, etc. Furthermore, the control circuitry 112 controls operating parameters based on input by the user as well as based on other current operating parameters. Specifically, the user interface 114 may include a display 116 for presenting, showing, or indicating, information to an operator. The control circuitry 112 may also include interface circuitry for communicating data to other devices in the system 100, such as the wire feeder 104. For example, in some situations, the power supply 102 wirelessly communicates with other welding devices within the welding system 100. Further, in some situations, the power supply 102 communicates with other welding devices using a wired connection, such as by using a network interface controller (NIC) to communicate data via a network (e.g., ETHERNET, 10baseT, 10base100, etc.). In the example of FIG. 1A, the control circuitry 112 communicates with the wire feeder 104 via the weld circuit via a communications transceiver 118, as described below.

The control circuitry 112 includes at least one controller or processor 120 that controls the operations of the power supply 102. The control circuitry 112 receives and processes multiple inputs associated with the performance and demands of the system 100. The processor 120 may include one or more microprocessors, such as one or more "general-purpose" microprocessors, one or more special-purpose microprocessors and/or ASICS, and/or any other type of processing device. For example, the processor 120 may include one or more digital signal processors (DSPs).

The example control circuitry 112 includes one or more storage device(s) 123 and one or more memory device(s) 124. The storage device(s) 123 (e.g., nonvolatile storage) may include ROM, flash memory, a hard drive, and/or any other suitable optical, magnetic, and/or solid-state storage medium, and/or a combination thereof. The storage device 123 stores data (e.g., data corresponding to a welding application), instructions (e.g., software or firmware to perform welding processes), and/or any other appropriate data. Examples of stored data for a welding application include an attitude (e.g., orientation) of a welding torch, a distance between the contact tip and a workpiece, a voltage, a current, welding device settings, and so forth.

The memory device 124 may include a volatile memory, such as random-access memory (RAM), and/or a nonvolatile memory, such as read-only memory (ROM). The memory device 124 and/or the storage device(s) 123 may store a variety of information and may be used for various purposes. For example, the memory device 124 and/or the storage device(s) 123 may store processor executable instructions 125 (e.g., firmware or software) for the processor 120 to execute. In addition, one or more control regimes for various welding processes, along with associated settings and parameters, may be stored in the storage device 123 and/or memory device 124, along with code configured to provide a specific output (e.g., initiate wire feed, enable gas flow, capture welding current data, detect short circuit parameters, determine amount of spatter) during operation. One or more lists or look up tables may be provided, and/or network connections to various databases available to inform decision-making, such as to access preferred welding parameters, to store updated welding parameter settings, etc.

In some examples, the welding power flows from the power conversion circuitry 110 through a weld cable 126 to the wire feeder 104 and the welding torch 106. The example weld cable 126 is attachable and detachable from weld studs at each of the power supply 102 and the wire feeder 104 (e.g., to enable ease of replacement of the weld cable 126 in case of wear or damage). Furthermore, in some examples, welding data is provided with the weld cable 126 such that welding power and weld data are provided and transmitted together over the weld cable 126. The communications transceiver 118 is communicatively coupled to the weld cable 126 to communicate (e.g., send/receive) data over the weld cable 126. The communications transceiver 118 may be implemented using serial communications (e.g., full-duplex RS-232 or RS-422, or half-duplex RS-485), network communications (e.g., Ethernet, PROFIBUS, IEEE 802.1X wireless communications, etc.), parallel communications, and/or any other type of communications techniques. In some examples, the communications transceiver 118 may implement communications over the weld cable 126.

The example communications transceiver 118 includes a receiver circuit 121 and a transmitter circuit 122. Generally, the receiver circuit 121 receives data transmitted by the wire feeder 104 via the weld cable 126 and the transmitter circuit 122 transmits data to the wire feeder 104 via the weld cable 126. The communications transceiver 118 enables remote configuration of the power supply 102 from the location of the wire feeder 104, and/or command and/or control of the wire feed speed output by the wire feeder 104 and/or the weld power (e.g., voltage, current) output by the power supply 102.

The example wire feeder 104 also includes a communications transceiver 119, which may be similar or identical in construction and/or function as the communications transceiver 118. While communication over a separate communications cable is illustrated in FIG. 1A, other communication media, such as wireless media, power line communications, and/or any other communications media, may be used.

In some examples, a gas supply 128 provides shielding gases, such as argon, helium, carbon dioxide, and so forth, depending upon the welding application. The shielding gas flows to a valve 130, which controls the flow of gas, and if desired, may be selected to allow for modulating or regulating the amount of gas supplied to a welding application. The valve 130 may be opened, closed, or otherwise operated by the control circuitry 112 to enable, inhibit, or control gas flow (e.g., shielding gas) through the valve 130. Shielding gas exits the valve 130 and flows through a cable 132 (which in some implementations may be packaged with the welding power output) to the wire feeder 104, which provides the shielding gas to the welding application. In some examples, the welding system 100 does not include the gas supply 128, the valve 130, and/or the cable 132.

In some examples, the wire feeder 104 uses the welding power to power the various components in the wire feeder 104, such as to power a wire feeder controller 134. As noted above, the weld cable 126 may be configured to provide or supply the welding power. The power supply 102 may also communicate with a communications transceiver 119 of the wire feeder 104 using the weld cable 126 and the communications transceiver 118 disposed within the power supply 102. In some examples, the communications transceiver 119 is substantially similar to the communications transceiver 118 of the power supply 102. The wire feeder controller 134 controls the operations of the wire feeder 104. In some examples, the wire feeder 104 uses the wire feeder controller 134 to detect whether the wire feeder 104 is in communication with the power supply 102 and to detect a current welding process of the power supply 102 if the wire feeder 104 is in communication with the power supply 102.

A contactor 135 (e.g., high amperage relay) is controlled by the wire feeder controller 134 and configured to enable or inhibit welding power to continue to flow to the weld cable 126 for the welding application. In some examples, the contactor 135 is an electromechanical device. However, the contactor 135 may be any other suitable device, such as a solid-state device. The wire feeder 104 includes a wire drive 136 that receives control signals from the wire feeder controller 134 to drive rollers 138 that rotate to pull wire off a spool 140 of wire. The wire is provided to the welding application through a torch cable 142. Likewise, the wire feeder 104 may provide the shielding gas from the cable 132 through the cable 142. The electrode wire, the shield gas, and the power from the weld cable 126 are bundled together in a single torch cable 144 and/or individually provided to the welding torch 106. In some examples, the contactor 135 is omitted and power is initiated and stopped by the power supply 102. In some examples, one or more sensors 127 are included with or connected to in the wire feeder 102 to monitor one or more welding parameters (e.g., power, voltage, current, wire feed speed, etc.) to inform the controller 134 during the welding process. In some examples, one or more sensors are included in the welding power supply 102.

The welding torch 106 delivers the wire, welding power, and/or shielding gas for a welding application. The welding torch 106 is used to establish a welding arc between the welding torch 106 and a workpiece 146. A work cable 148 couples the workpiece 146 to the power supply 102 (e.g., to the power conversion circuitry 110) to provide a return path for the weld current (e.g., as part of the weld circuit). The example work cable 148 attachable and/or detachable from the power supply 102 for ease of replacement of the work cable 148. The work cable 148 may be terminated with a clamp 150 (or another power connecting device), which couples the power supply 102 to the workpiece 146. In some examples, one or more sensors 147 are included with or connected to the welding torch 106 to monitor one or more welding parameters (e.g., power, voltage, current, wire feed speed, etc.) to inform the controller 134 and/or 112 during the welding process.

Figure 1B:
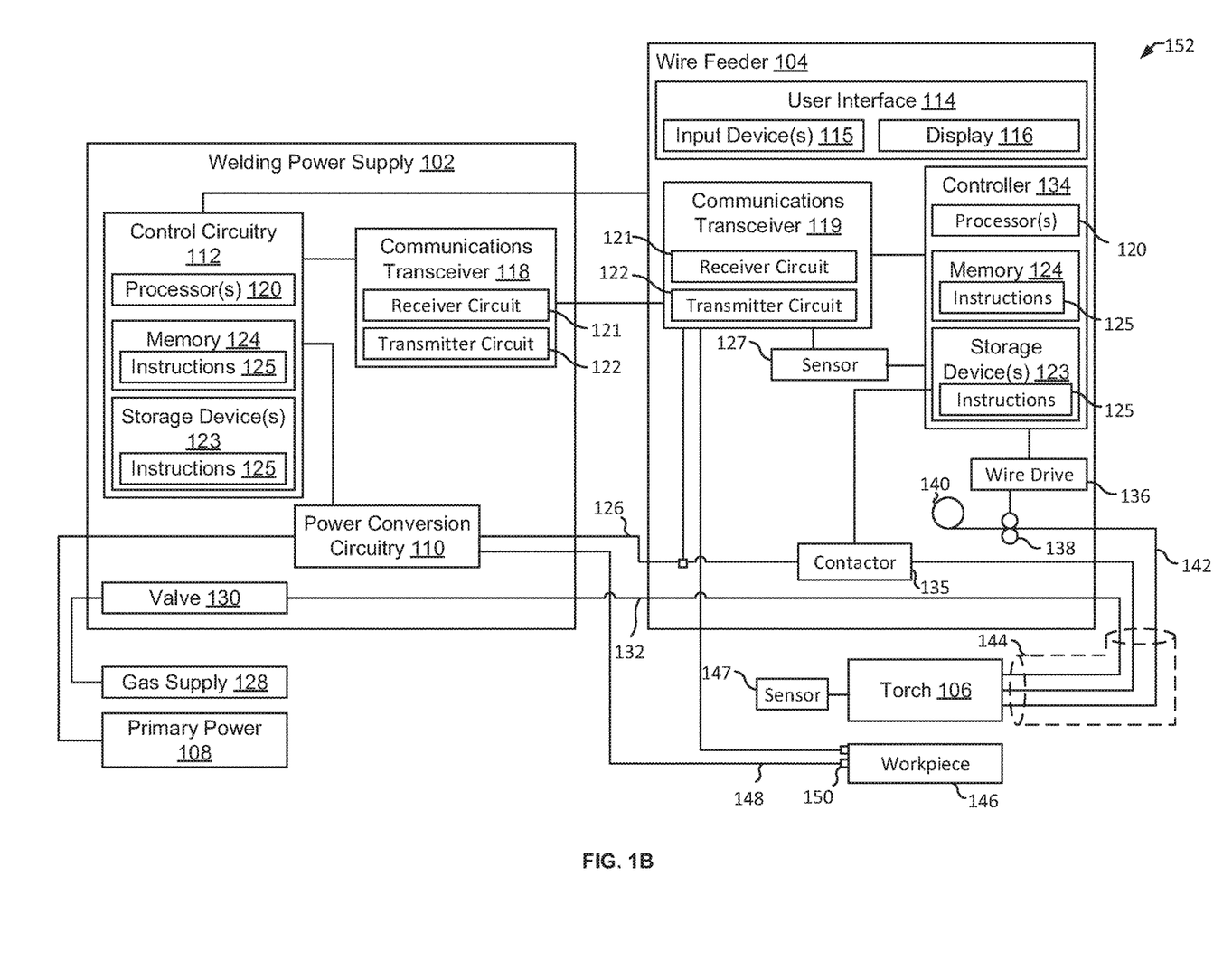
FIG. 1B is a schematic diagram of another example welding system to implement an input power characteristics monitoring, analysis and/or presentation process, in accordance with aspects of this disclosure.

FIG. 1B is a schematic diagram of another example welding system 152 in which the wire feeder 104 includes the user interface 114 in addition or as an alternative to the user interface on the welding power supply 102. In the example of FIG. 1B, the control circuitry 134 of the wire feeder 104 implements the determinations of the welding program and welding parameters which are described with reference to the control circuitry 112 of FIG. 1A.

Figure 1C:
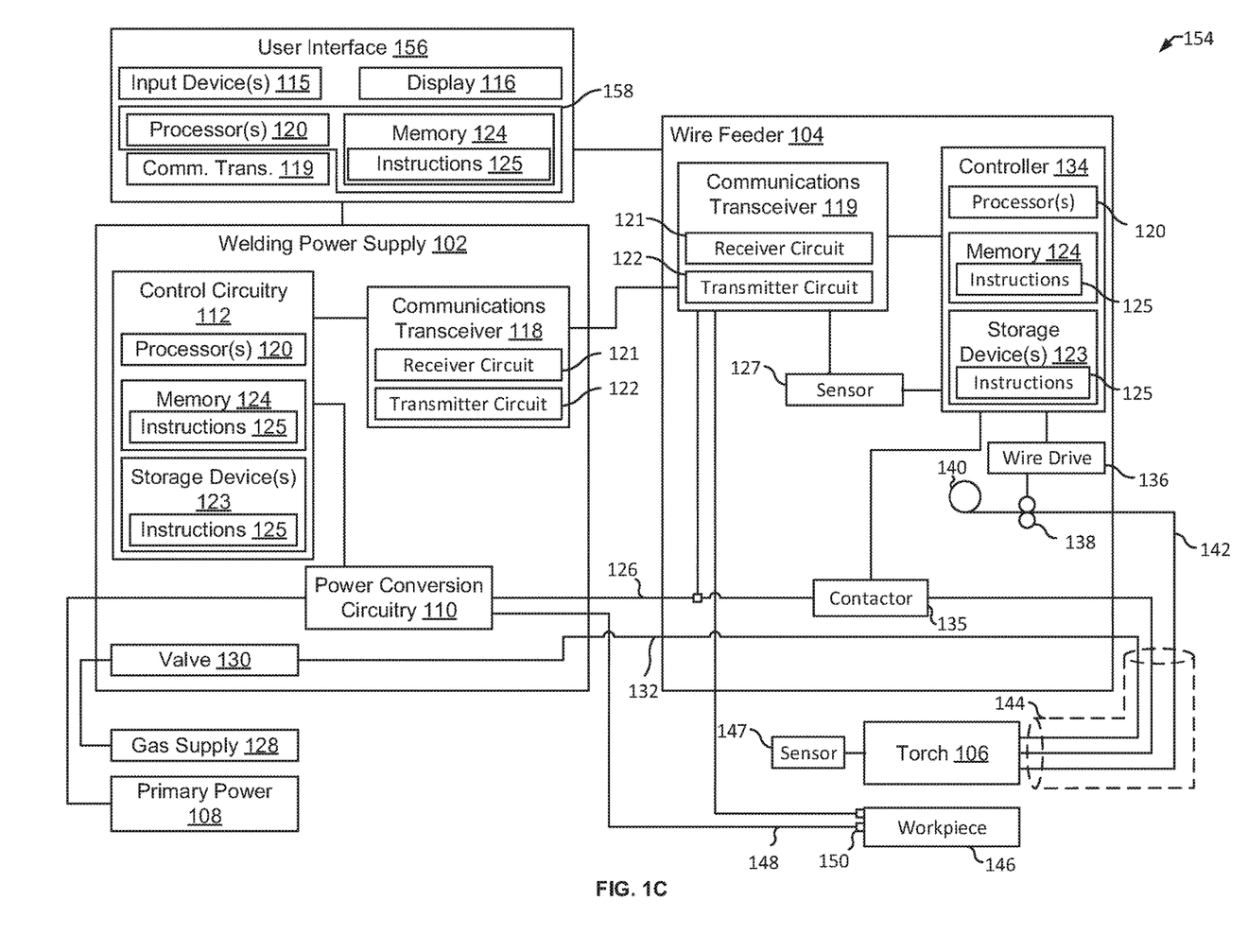
FIG. 1C is a schematic diagram of another example welding system to implement an input power characteristics monitoring, analysis and/or presentation process, in accordance with aspects of this disclosure.

FIG. 1C is a schematic diagram of another example welding system 154 including a separate user interface 156. The user interface 156 is a separate device, and may be connected to the welding power supply 102 and/or to the wire feeder 104 to provide commands and/or control information. The example user interface 156 includes the input devices 115 and the display 116, and includes control circuitry 158. The example control circuitry 158 includes the processor(s) 120 and the memory 124 storing the instructions 125. The example user interface 156 further includes a communications transceiver 119 to enable communications between the user interface 156 and the welding power supply 102 and/or the wire feeder.

Although FIGS. 1A-1C are illustrated as having a user interface (114, 156) incorporated with a particular system, the illustration is exemplary such that one or more of the interfaces disclosed herein as well as additional user interfaces may be incorporated in one or more of the example welding systems disclosed herein. Furthermore, although power supply 102 and wire feeder 104 are illustrated as independent units, in some examples, the power supply and wire feeder can be housed in a single enclosure or otherwise integrated. Additionally or alternatively, a single controller, control circuitry, and/or interface can control operation of both the power supply and wire feeder, in some examples.

Figure 2A:
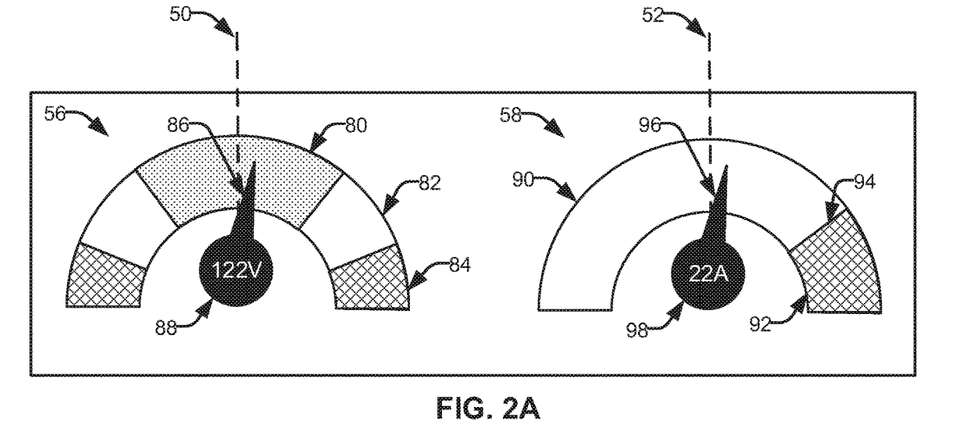
FIGS. 2A and 2B is an example interface for presentation of an input power characteristics monitoring, analysis and/or presentation process, in accordance with aspects of this disclosure.

FIG. 2A illustrates example graphical interfaces 56 and 58 provided to implement the input power characteristics monitoring and/or analysis process disclosed herein. As illustrated, graphical interface 56 represents input voltage and graphical interface 58 represents input current, each corresponding to a power input (e.g. from an external source, such as mains power). Although voltage and current are used in particular examples, any power characteristic may be monitored, analyzed, and/or displayed, such as power, voltage, current, frequency, power factor, harmonic distortion, line balance, etc.

Figure 2B:
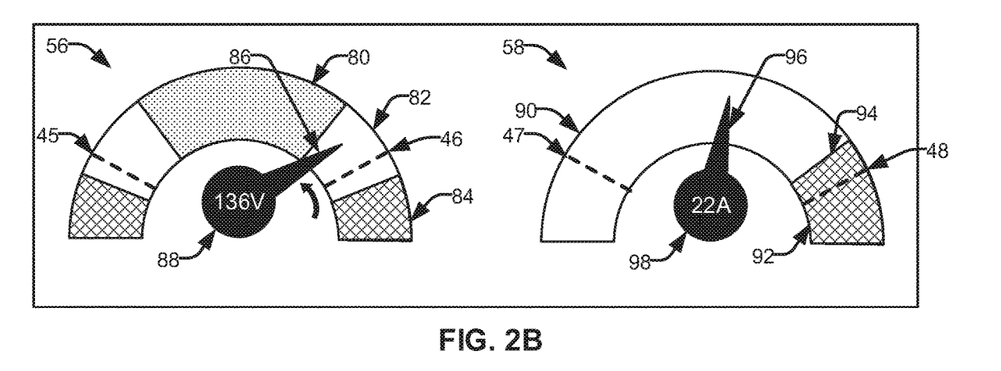

Information provided to the graphical interfaces 56 and 58 may be first received at control circuitry 112, 134, which is configured to analyze, manipulate, store, transmit, and/or generate data for use by an operator. For example, by calculating and displaying operational ranges for the input characteristics, data corresponding to the input (e.g., variations, duration, peaks and troughs, average values, etc.) can be stored (e.g., as a historical record) and/or displayed. The data can be used to inform the operator on use of the power supply and/or to diagnose performance and/or maintenance issues. The graphical interfaces 56, 58, as provided in FIGS. 2-3, display a straight-forward graphical representation of the input power characteristics, which may include diagnostic values (e.g., peak values achieved during a welding operation) and/or alerts (e.g., that a predetermined threshold and/or value has been exceeded).

As shown in graphical interface 56, a first (central or middle) band 80 of the first operating range may correspond to a first "preferred" subset (e.g., variance and/or subrange) of a range of operational values (e.g., input power capacity fully delivers demanded power output), as determined by the control circuitry 112, 134.

As shown, the first range of operational values 80 may span a first predetermined threshold (e.g., 10%) or a first predetermined value (e.g., 10V, 5 A) below and/or above a rated input value 50 (e.g., an expected power characteristic value from the relevant/primary power source; 120V, 240V, 15A, 20 A). The first range of operational values 80 indicates to the operator that an output from the welding power supply 100 should meet the criteria for a desired power output and/or weld performance.

A second band 82 (e.g., on the right and left of the first operational range) may correspond to values that are still within an acceptable second range of operational values, but are not as preferred. The range of values encompassed by the two bands 84 (e.g., on the low and high ends of the first operational range of values) represents values that, if maintained, may provide degraded weld quality and/or compromise the power supply performance.

The second range of operational values 82 may span a second predetermined threshold (e.g., 20%) or a predetermined value (e.g., 20V, 10 A) below and/or above a rated input value 50. The second range of operational values 82 indicates that the welding power supply 10 output is expected to meet standard power output and/or weld performance criteria, but degraded weld performance may be expected (e.g., lower input voltages and/or current may result in a loss of higher welding outputs).

A third range of operational values 84 lies outside the second range of operational values 82. For example, if an evaluation of input power characteristics (e.g., during a power-up sequence, during a welding operation, etc.) determines that one or more of the input power characteristics is less than or greater than the lower or upper values of the second range of operational values 82, the output of the welding power supply 100 may be limited and/or disabled, and an alert will be provided to the operator (e.g., a visual, audible, haptic, or other feedback signal such as to a networked remote computer).

In some examples, each of the first, second and third range of operational values is displayed with one or more distinguishing characteristics. For instance, the first range of operational values 80 may be displayed as green, the second range of operational values 82 may be displayed as yellow, and the third range of operational values 84 may be displayed as red. However, other characteristics may distinguish the ranges (e.g., patterns, text, arrangement, intensity, animation, etc.).

An average value of the input characteristic can be calculated and displayed within the relative graphical interface, and arranged relative to the rated value and/or the one or more ranges of operational values. For example, as shown on graphical interface 56 in the example of FIG. 2A, the input voltage registers at 122V, and is represented in indicator 88. A marker 86 extends into the one or more ranges of operational values 80, 82, 84, and moves dynamically, as the average value is updated during the welding process. In some examples, as input or line voltage changes more quickly than can be observed by a person, a filter can be employed to integrate the feedback (e.g., calculating a running or periodically calculated average value). In some examples, the average value could be a percentage, but is shown with relevant units.

Similarly, an average current value can be calculated for graphical interface 58. The value can be displayed in indicator 98, and marker 96 provides a visual of the relative magnitude of the current value with respect to the range of values 90 and/or the extension range 92. Each graphical element may be arranged on graphical interface 58 with respect to rated input current 52.

In the example of FIG. 2A, the graphical interface 58 has two graphical bands. The first graphical band 90 shows the operational input current range. The second graphical band 92 shows an extension range, which exceeds a current value or level 94 determined as a maximum current value for the operational range (e.g., calculated based on primary input current and/or a predetermined value or threshold). The extension range 92 represents a range of current values where the input or primary current is above the preferred operation range 90, which may lead to a circuit breaker trip, for instance.

In some welding processes that employ short circuit transfer (e.g., GMAW), control of the output of the welding power supply 100 may be limited to avoid exceeding operational parameters of one or more of a conversion circuit, insulation system, and/or prevent tripping a circuit breaker. For instance, the control circuitry 112, 134 may limit an instantaneous peak current and/or an average current (as disclosed herein) in a primary and/or a secondary circuit. During welding, the short circuit transfer often requires a high temporary peak current when a short circuit occurs. This high temporary peak current may be significantly higher than the average current operating in the operational range 90, exceed value 94 and enter into the extension range 92.

In some examples, the control circuitry 112, 134 may employ a "foldback" technique to limit the average output current to ensure the current demand is not maintained in the extension range 92 for long periods of time. For example, a foldback system serves as a limit on average current limit while still allowing for higher instantaneous peak currents for limited amounts of time. In the graphical interface 58, if the welding power source is consuming too much current, the marker 96 will show in the extension range 92. As the foldback circuit reduces the current, the marker 96 will drop below the boundary value 94 (at the interface between the operational range 90 and the extension range 92).

Figure 3:
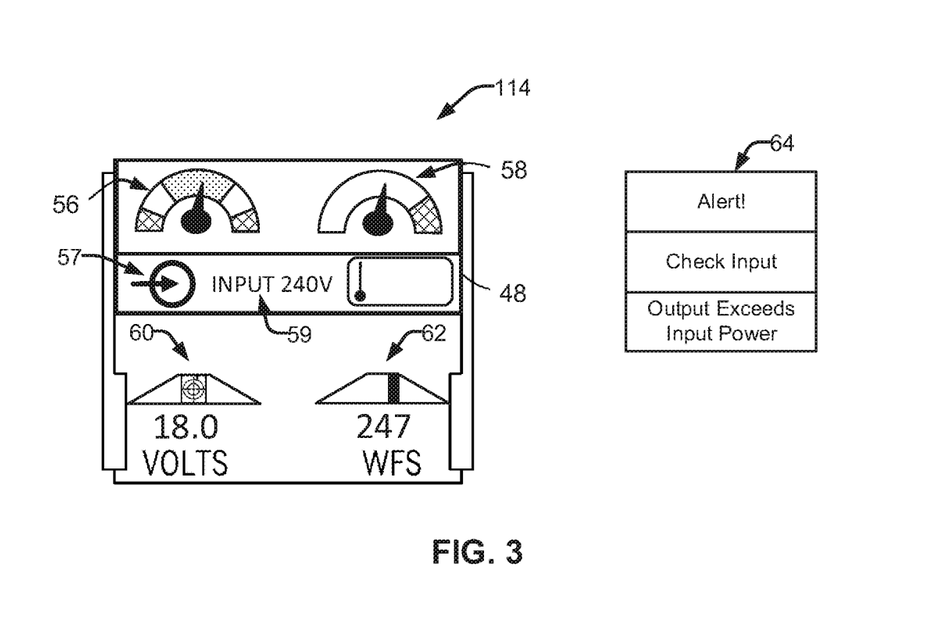
FIG. 3 is another example interface for the input power characteristics monitoring, analysis and/or presentation process, in accordance with aspects of this disclosure.

The display may also provide an indication that the system is limiting the current output (e.g., on the corresponding graphical interface and/or via notification interface 64, shown in FIG. 3). The indication may be visual (e.g., text, color, and/or flashing the red band on/off, switching the needle from gray to red, flashing the numerical current in the body of the needle, turning the numerical current red in the body of the needle, etc.) or audible.

In some examples, the welding power supply 100 may be placed on a "soft line," in other words, the service voltage has dropped significantly as the current increases. This result can be displayed on the first graphical interface 56 as marker 86 shifts to the lower range of values. Similarly, the user interface 114 may also provide an indication that the voltage is dropping (e.g., via notification interface 64).

In some examples, at the end of each weld, one or more of the first graphical interface 56 and the second graphical interface 58 displays a hold line voltage and/or a hold line current for a predetermined period of time (e.g., 1-30 seconds). For instance, a hold line represents an average input voltage and/or current monitored over the predetermined period of time at the end of the weld. The average is calculated in order to avoid variations in the input power characteristic common at the very end of the weld (e.g., a spike or drop). Being able to view the hold line voltage and/or current represented by this hold time allows the user to complete the weld, terminate the welding operation, lift a welding helmet to view the graphical interface 56, 58 and observe the input voltage and/or input current during the welding operation. Following the predetermined period of time, the first graphical interface 56 and the second graphical interface 58 return to a display of the average input power characteristic value 88, 98, respectively.

In the example of FIG. 2B, one or more visual indicators may be provided to illustrate one or more events associated with an input power characteristic. For example, the control circuitry may monitor the average input characteristic over a predetermined period of time in order to determine a maximum average value. For instance, during a welding operation the average voltage level may reach a maximum value (which may be calculated over a set period of time and/or for an entire weld, welding process, etc.). The maximum voltage value, represented by line 46 or other graphical indicator, may be constantly displayed (e.g., held until automatically or manually reset) to represent the highest value achieved during welding, and/or be presented historically for analysis. This graphical indicator, represented as line 46, could also be paired with a corresponding current graphical indicator 47, representing a current value on graphical interface 58 that shows where the other measurement was (e.g. at the same point in time) as compared to the maximum voltage level represented byline 46.

In some examples, the input voltage may be at a minimum value, represented by line 45, when the input current is at a maximum, represented by line 48. Presenting this information graphically and/or storing this information in memory, for example, provides information for analysis which may indicate the input power is insufficient, which would be helpful for troubleshooting. In the example of FIG. 2B, the marker 86 has swung back to the left, yet the average value shown in 88 and the maximum value represented by line 46 remains to inform the operator (e.g., for a second period of time).

Similarly, line 48 is provided in graphical interface 58 to represent a maximum current value achieved during welding. Although the average value has returned to within the operational range 90, the line 48 remains to inform the operator. The data can be maintained in a historical record as well, and can be viewed on the display 114 of the welding power supply 100, for example.

Additionally or alternatively, the information may be presented in a variety of ways beyond the particular examples illustrated herein. For example, the range of operational values could be displayed as horizontal and/or vertical bars, a line graph (similar to an electrocardiogram), to list a few non-limiting examples. The values may be shown over time, as discrete periods.

As illustrated in FIG. 3, graphical interfaces 56 and 58 may be incorporated in a user interface 114 that includes additional information (e.g., welding output parameters, alerts, etc.). As shown in FIG. 3, graphical interface 60 represents an output voltage and graphical interface 62 represents wire feed speed, although any welding parameter may be displayed for a given welding operation. An input power indicator 57 may be displayed with one or more informational elements 59, such as during a start-up routine, a calibration process, a transition (e.g., between welding processes), a power-down routine, as a list of non-limiting examples.

In some examples, messages may be displayed on an information bar 64 associated with one or more of the input power characteristics. The information can include alerts associated with changes in input power characteristic values that impact weld performance, as disclosed herein. The information bar 64 may display graphics or text to the operator to providing instructions or responses corresponding to a user input. In some examples, the information can be presented in a variety of ways to indicate the importance of the alert, such as by changes in the fonts, in display colors, and/or in association with color or graphics (e.g., red exclamation marks, etc.) such that the attention of the user may be better attracted. These features may provide supplemental guidance relating to appropriate welding settings to operators or users of the welding system(s) 100, 152, 154, and thus ensure that welds are performed appropriately.

In FIG. 3, the user interface 114 may include a heat indicator, which represents the temperature of the system 100, 152, 154 during a welding operation. Additionally or alternatively, the heat indicator can be displayed with varying characteristics, such as changing colors to indicate a relative change in temperature (e.g., blue indicates a cold or dropping temperature, whereas red indicates a high or increased temperature). In some examples, the heat indicator can provide indications of various components and/or the environmental temperature. In examples, the displayed indicator can be selected by the operator. Such an example would be intended to convey a relative amount of heat input into the welding application.

With reference to FIG. 1A, in some examples, an additional and/or alternative electronic recording device 109 can be provided to measure and/or receive data corresponding to the input and/or output characteristics of the welding power supply 100. For example, the electronic recording device can measure and store data during a welding operation to provide a historical record of input and/or output characteristics associated with operational values and related incidents (e.g., corresponding to a machine fault, a circuit breaker trip, a particular weld, etc.).

The electronic recording device 109 can be configured to measure and/or record data corresponding to input and/or output characteristics. For example, the electronic recording device 109 can be located on the primary circuit (e.g., along the input power pathway from the primary power 108 to power conversion circuitry 110), and may include one or more sensors and/or sensing circuitry to directly or indirectly measure the input voltage, current, power characteristics, etc. In some examples, the electronic recording device 109 may include communication circuitry to transmit and/or receive data associated with welding output from the main power source controller 112. The data stored may reflect historical information of the power characteristics during the welding operation, such as a time period at the end of the welding operation, for example.

In some examples, the electronic recording device 109 can be accessed via an interface 111 while the welding power supply 100 is experiencing a fault or turned off, and can be supplied power necessary to transmit information from a connected device (e.g., a USB device, a wireless interrogator, etc.) without power being supplied to the welding power source.

Figure 4A:
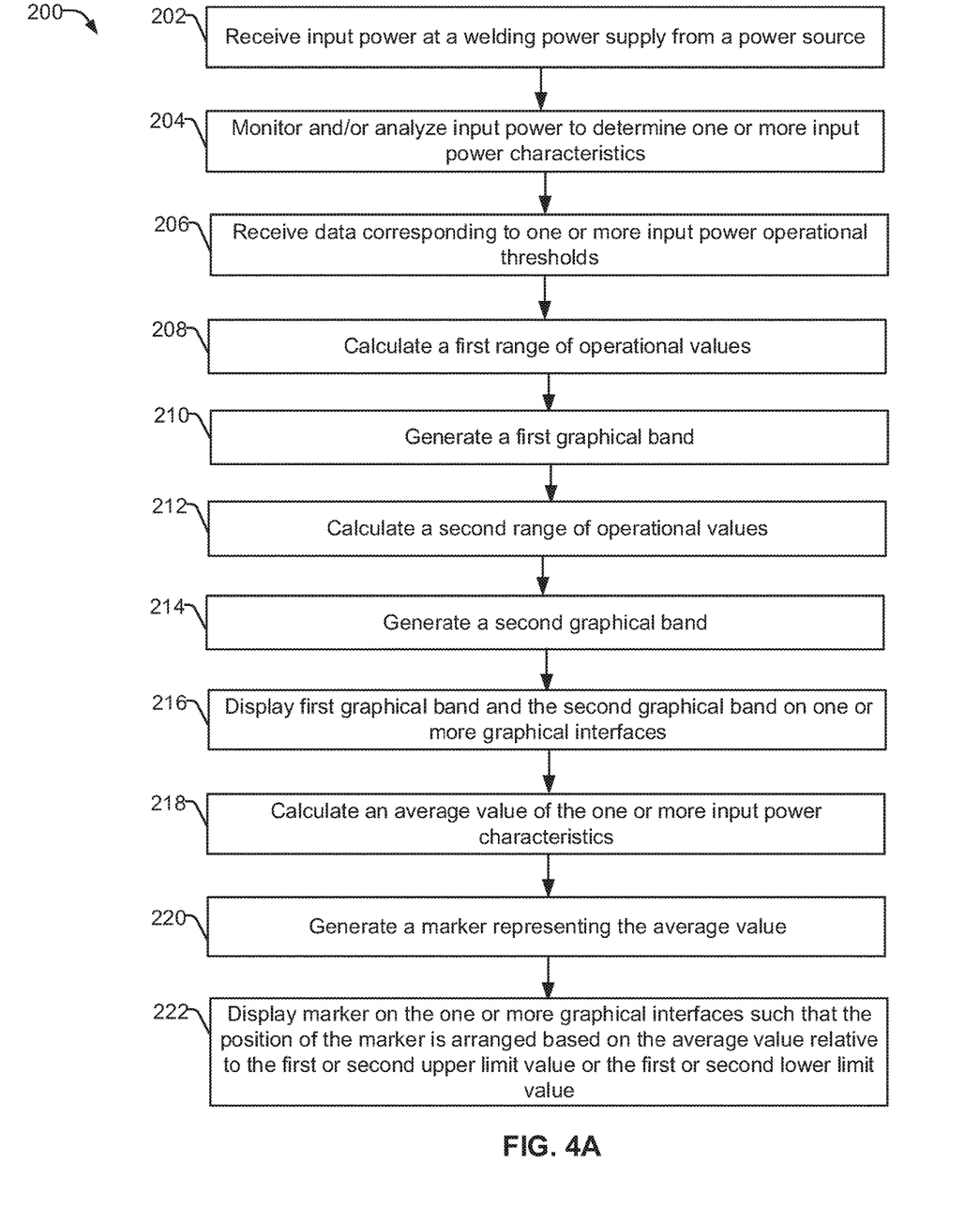
FIGS. 4A-4C provide flowcharts representative of example machine-readable instructions that may be executed by the example system of FIGS. 1-3 to implement the input power characteristics monitoring, analysis and/or presentation process, in accordance with aspects of this disclosure.
Figure 4B:
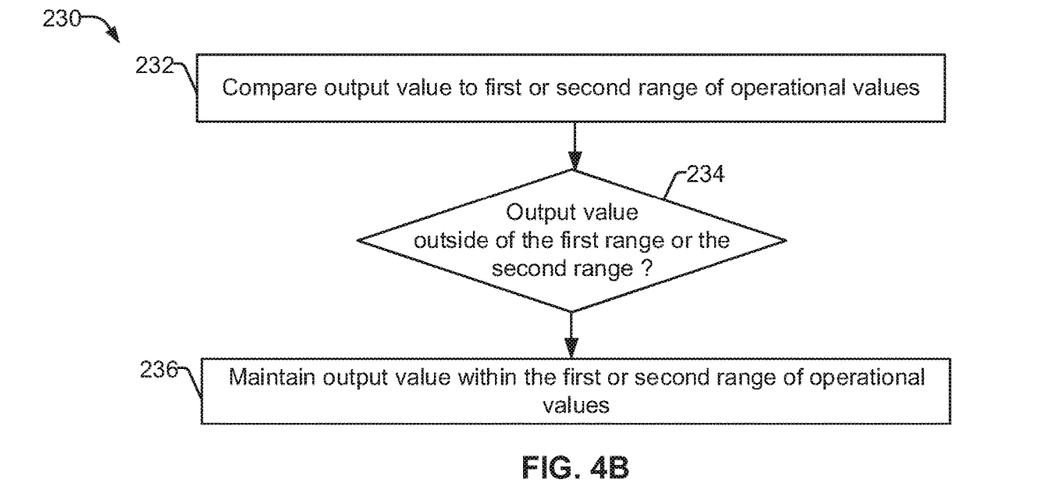

FIGS. 4A and 4B provide flowcharts representative of example machine readable instructions 200 which may be executed by the example welding system 100 of FIG. 1A, the example welding system 152 of FIG. 1B, and/or the example welding system 154 of FIG. 1C, to configure one or more graphical interfaces representing input power characteristics (e.g., for one or more welding processes). The example instructions 200 may be stored in the storage device(s) 123 and/or the memory 124 and executed by the processor(s) 120 of the control circuitry 112. The example instructions 200 are described below with reference to the example graphical user interfaces of FIGS. 1 through 3.

In block 202, an input power is received at a welding power supply from a power source (e.g., from mains power). In block 204, the input power is monitored and/or analyzed by control circuitry (e.g., control circuitry 112, 134, 120), to determine one or more input power characteristics (e.g., values associated with power, voltage, current, frequency, power factor, harmonics, distortion, line balance, etc.).

In block 206, data corresponding to one or more input power operational thresholds corresponding to the one or more input power characteristics is received at the control circuitry. In some examples, the one or more input power operational thresholds correspond to one or more welding process types. Thus, the data from an input relating to a first welding process type is received at the control circuitry (from an operator, a weld plan, based on a recognition of a particular welding type tool, etc.). In some examples, the control circuitry may access a list of input power operational threshold corresponding to welding process types (e.g., at storage device(s) 123 and/or the memory 124, on a networked system, etc.). A range of operational values for the one or more input power characteristics can then be calculated based at least in part on the welding process type.

In block 208, a first range of operational values including a first upper limit value or a first lower limit value for the one or more input power characteristics is calculated by the control circuitry based on the first input power operational threshold. In some examples, the data is stored in a list of values corresponding to the one or more input power characteristics, accessible to the control circuitry (e.g., at storage device(s) 123 and/or the memory 124, on a networked system, etc.). In some examples, the upper limit or the lower limit is a predetermined value or a percentage (between 5 and 50 percent) of the rated input value.

In block 210, a first graphical band representing the first range of operational values for the one or more input power characteristics is generated by the control circuitry.

In block 212, a second range of operational values including a second upper limit value or a second lower limit value for the one or more input power characteristics is calculated by the control circuitry based on the second input power operational threshold.

In block 214, a second graphical band representing the second range of operational values for the one or more input power characteristics is generated by the control circuitry.

In block 216, the first graphical band and the second graphical band are displayed on one or more graphical interfaces (e.g., graphical interfaces 56, 58, on display 48, etc.) relative to a rated input value (e.g., values 100, 102).

In block 218, an average value of the one or more input power characteristics at the input circuit is calculated. In some examples, the values of the one or more input power characteristics are measured over a predetermined period of time, and the average input power value is calculated based on the measured value over the predetermined period of time.

In block 220, a marker representing the average value of the one or more input power characteristics is generated. In block 222, the marker is displayed (e.g., on display 48) on the one or more graphical interfaces such that the position of the marker is arranged based on the average value relative to the first or second upper limit value or the first or second lower limit value.

In some additional or alternative examples, as provided in FIG. 4B, a method 230 can be executed such that the control circuitry controls a welding power supply output based on the first and second ranges of operational values. As shown in block 232, the control circuitry is further configured to compare an output value corresponding to one or more output power characteristics to the first range of operational values or the second range of operational values.

In block 234, the control circuitry determines if the output value is outside of the first range or the second range. In block 236, the control circuitry controls the welding power supply to maintain the output value within the first range of operational values or the second range of operational values, based on the comparison.

Figure 4C:
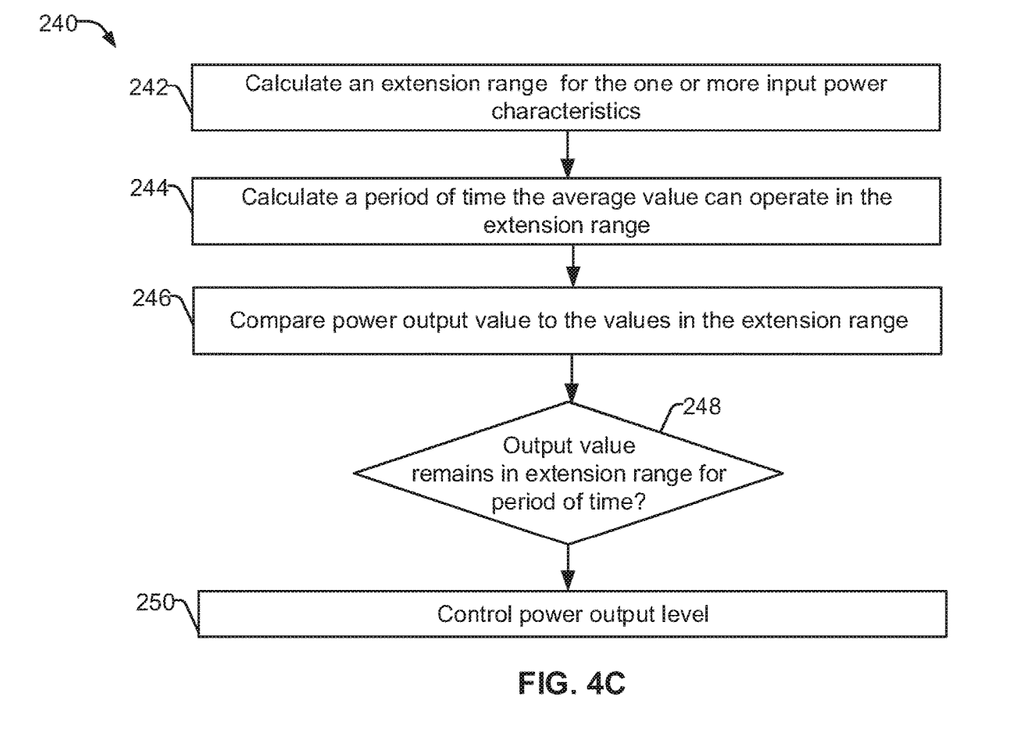

In some additional or alternative examples, as provided in FIG. 4C, a method 240 can be executed such that the control circuitry controls a welding power supply output based on an extension range (e.g. extension range 92). For example, an extension range beyond a first operational range may be calculated such that the corresponding welding output may operate in the extension range for a limited amount of time. In particular, the control circuitry is further configured to calculate an extension range for the one or more input power characteristics based on one or more of the rated value, the welding process type, or the range of operational values for the one or more input power characteristics as shown in block 242.

In block 244, the control circuitry calculates a period of time the average value can operate in the extension range. For example, at greater values (e.g., higher current values), the amount of time the output value can maintain that value level is less than at lower values (e.g., near the border of the operational range).

In block 246, the control circuitry compares the output value to the values in the extension range. In block 248, the control circuitry determines whether the output value can remain in the extension range and for how long.

In block 250, the control circuitry controls a power output level in response to the average value operating in the extension range based on the determination. For example, if the output value is operating within the extension range for a time greater than the calculated period of time, the output value will be lowered. As the value lowers, the time period may be calculated dynamically to update the amount of time and/or rate of lowering the value. Further, one or more sensors may be employed to determine the amount of time the input value may be maintained within the extension range and for how long (e.g., a temperature sensor).

The present devices and/or methods may be realized in hardware, software, or a combination of hardware and software. The present methods and/or systems may be realized in a centralized fashion in at least one computing system, processors, and/or other logic circuits, or in a distributed fashion where different elements are spread across several interconnected computing systems, processors, and/or other logic circuits. Any kind of computing system or other apparatus adapted for carrying out the methods described herein is suited. A typical combination of hardware and software may be a processing system integrated into a welding power supply with a program or other code that, when being loaded and executed, controls the welding power supply such that it carries out the methods described herein. Another typical implementation may comprise an application specific integrated circuit or chip such as field programmable gate arrays (FPGAs), a programmable logic device (PLD) or complex programmable logic device (CPLD), and/or a system-on-a-chip (SoC). Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term "non-transitory machine readable medium" is defined to include all types of machine-readable storage media and to exclude propagating signals.

The control circuitry may identify welding conditions of a given weld and automatically find the optimum value of rate of current rise for the welding conditions. An example control circuit implementation may be an Atmel Mega16 microcontroller, a STM32F407 microcontroller, a field programmable logic circuit and/or any other control or logic circuit capable of executing instructions that executes weld control software. The control circuit could also be implemented in analog circuits and/or a combination of digital and analog circuitry. Examples are described herein with reference to an engine-driven stick welder, but may be used or modified for use in any type of high frequency switching power source.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A welding power supply, comprising:
   one or more graphical interfaces representing one or more input power characteristics of the welding power supply; and
   a control circuitry configured to:
      generate a graphical band representing a range of operational values including an upper limit value or a lower limit value for one or more input power characteristics based on one or more thresholds;
      display the graphical band on the one or more graphical interfaces relative to a rated input value;
      calculate an average value of the one or more input power characteristics at the input circuit;
      display a marker on the one or more graphical interfaces such that the position of the marker is arranged based on the average value relative to the upper limit value or the lower limit value of the range of operational values;
      calculate an extension range for the one or more input power characteristics based on one or more of the rated value, the welding process type, or the range of operational values for the one or more input power characteristics;
      generate a line representing a maximum current value achieved during welding; and
      display the line in the graphical interface as the average value of the welding power supply has returned to within the operational range.

2. The welding power supply of claim 1, wherein the graphical band is a first graphical band corresponding to a first range of operational values for the one or more power characteristics based on a first input power operational threshold of the one or more input power operational threshold, the control circuitry further configured to generate a second graphical band corresponding to a second range of operational values based on a second input power operational threshold of the one or more input power characteristics.

3. The welding power supply of claim 2, wherein the first input power operational threshold corresponds to a first variance from the rated input value, and the second input power operational threshold corresponds to a second variance from the rated input value.

4. The welding power supply of claim 2, wherein the control circuitry is further configured to generate a third graphical band corresponding to a third range of operational values based on a third input power operational threshold of the one or more input power characteristics.

5. The welding power supply of claim 1, wherein the control circuitry is further configured to:
   receive data corresponding to one or more input power operational threshold corresponding to the one or more input power characteristics, the one or more input power operational threshold including one or more thresholds; and
   calculate the range of operational values including an upper limit value or a lower limit value for the one or more input power characteristics based on the one or more thresholds.

6. The welding power supply of claim 1, wherein the maximum current value is within the extension range.

7. A welding power supply, comprising:
   one or more graphical interfaces representing one or more input power characteristics of the input power; and a control circuitry configured to:
receive data corresponding to a first input power operational threshold corresponding to one or more input power characteristics;
receive an input relating to a first welding process type;
access a list of input power operational thresholds corresponding to welding process types;
calculate a first range of operational values including a first upper limit value or a first lower limit value for the one or more input power characteristics based at least in part on the first input power operational threshold on the first welding process type;
generate a first graphical band representing the first range of operational values for the one or more input power characteristics;
calculate a second range of operational values including a second upper limit value or a second lower limit value for the one or more input power characteristics based on the second input power operational threshold;
generate a second graphical band representing the second range of operational values for the one or more input power characteristics;
display the first graphical band and the second graphical band on the one or more graphical interfaces relative to a rated input value;
calculate an average value of the one or more input power characteristics at the input circuit;
generate a marker representing the average value of the one or more input power characteristics; and
display the marker on the one or more graphical interfaces such that the position of the marker is arranged based on the average value relative to the first or second upper limit value or the first or second lower limit value;
generate an indication current value achieved during welding; and
display the indication in the graphical interface as the average value of the welding power supply has returned to within the operational range.

8. The welding power supply of claim 7, wherein the control circuitry is further configured to:
measure values of the one or more input power characteristics over a predetermined period of time; and
calculate the average input power value based on the measured value over the predetermined period of time.

9. The welding power supply of claim 7, wherein the upper limit or the lower limit corresponds to a predetermined value or a percentage of the rated input value, and wherein the upper limit or the lower limit is between 5 and 50 percent of the rated input value.

10. The welding power supply of claim 7, wherein data corresponding to the one or more input power operational threshold are stored in a list of input power operational threshold, the control circuitry further configured to receive the data from the list.

11. The welding power supply of claim 7, wherein the one or more input power operational threshold correspond to one or more welding process types.

12. The welding power supply of claim 11, wherein the control circuitry is further configured to:
calculate the range of operational values for the one or more input power characteristics based at least in part on the welding process type.

13. The welding power supply of claim 7, wherein the control circuitry is further configured to:
calculate an extension range for the one or more input power characteristics based on one or more of the rated value, the welding process type, or the range of operational values for the one or more input power characteristics;
calculate a period of time the average value can operate in the extension range; and
control a power output level in response to the average value operating in the extension range for a time greater than the calculated period of time.

14. The welding power supply of claim 7, wherein the control circuitry is further configured to generate an alert when the average value of the one or more input power characteristics is outside the range of operational values.

15. The welding power supply of claim 7, wherein the control circuitry is further configured to:
compare the average input value with the rated input value;
calculate a voltage drop between the power source and the input circuit based on the comparison; and
generate an alert when the voltage drop is outside a predetermined threshold value.

16. The welding power supply of claim 7, wherein the control circuitry is further configured to:
calculate a second range of operational values including a second upper limit value or a second lower limit value for the one or more input power characteristics based on the second input power operational threshold; and
generate a second graphical band representing the second range of operational values for the one or more input power characteristics.

17. The welding power supply of claim 16, wherein the control circuitry is further configured to:
monitor the average value over a first period of time;
determine a maximum average input value over the first period of time;
generate an graphical indicator corresponding to the maximum average value; and
display the graphical indicator on the one or more graphical interfaces such that the position of the graphical indicator is arranged relative to the first or second upper limit value or the first or second lower limit value for a second period of time.

18. The welding power supply of claim 16, wherein the control circuitry is further configured to display a first characteristic on the first graphical band and a second characteristic on the second graphical band, wherein the first or second characteristic comprises one of a color, an intensity, a shape, a size, or a pattern.

19. The welding power supply of claim 16, wherein the control circuitry is further configured to control the welding power supply to maintain an output value of one or more output power characteristics within the first range of operational values or the second range of operational values.

20. A welding power supply, comprising:
one or more graphical interfaces representing one or more input power characteristics of the input power; and
a control circuitry configured to:
receive data corresponding to a first input power operational threshold corresponding to one or more input power characteristics;
calculate a first range of operational values including a first upper limit value or a first lower limit value for the one or more input power characteristics based at least in part on the first input power operational threshold on the first welding process type;
generate a first graphical band representing the first range of operational values for the one or more input power characteristics;

display the first graphical band on the one or more graphical interfaces relative to a rated input value;
calculate an average value of the one or more input power characteristics at the input circuit;
generate a marker representing the average value of the one or more input power characteristics;
display the marker on the one or more graphical interfaces such that the position of the marker is arranged based on the average value relative to the first upper limit value or the first lower limit value;
calculate an extension range for the one or more input power characteristics based on one or more of the rated value, the welding process type, or the range of operational values for the one or more input power characteristics;
calculate a period of time the average value can operate in the extension range; and
control a power output level in response to the average value operating in the extension range for a time greater than the calculated period of time.

* * * * *